US010018800B2

(12) United States Patent
Cheng

(10) Patent No.: US 10,018,800 B2
(45) Date of Patent: Jul. 10, 2018

(54) LENS DRIVING APPARATUS

(71) Applicant: Kwok Sing Cheng, Hong Kong (HK)

(72) Inventor: Kwok Sing Cheng, Hong Kong (HK)

(*) Notice: Subject to any disclaimer, the term of this patent is extended or adjusted under 35 U.S.C. 154(b) by 74 days.

(21) Appl. No.: 14/895,501

(22) PCT Filed: Sep. 23, 2014

(86) PCT No.: PCT/CN2014/087221
§ 371 (c)(1),
(2) Date: Dec. 3, 2015

(87) PCT Pub. No.: WO2015/043459
PCT Pub. Date: Apr. 2, 2015

(65) Prior Publication Data
US 2016/0116703 A1    Apr. 28, 2016

Related U.S. Application Data

(60) Provisional application No. 61/883,275, filed on Sep. 27, 2013.

(51) Int. Cl.
*G02B 7/08* (2006.01)
*G02B 27/64* (2006.01)
(Continued)

(52) U.S. Cl.
CPC ............ *G02B 7/08* (2013.01); *G02B 27/646* (2013.01); *G03B 3/10* (2013.01); *G03B 5/02* (2013.01);
(Continued)

(58) Field of Classification Search
CPC .......... G02B 27/646; G02B 7/08; G02B 7/09; G02B 7/04; G02B 7/28; G02B 7/282; G03B 3/10; G03B 5/00; G03B 5/02; G03B 2205/0007; G03B 2205/0015; G03B 2205/0069; H04N 5/2253; H04N 5/2254;
(Continued)

(56) References Cited

U.S. PATENT DOCUMENTS

| 2011/0262122 A1* | 10/2011 | Minamisawa | G03B 5/00 396/55 |
| 2011/0286099 A1* | 11/2011 | Shiraki | G02B 7/023 359/557 |

FOREIGN PATENT DOCUMENTS

| CN | 101819314 A | 9/2010 |
| CN | 102177465 A | 9/2011 |

(Continued)

OTHER PUBLICATIONS

International Search Report of PCT Patent Application No. PCT/CN2014/087221 dated Dec. 19, 2014.

*Primary Examiner* — Marin Pichler

(57) ABSTRACT

A lens driving apparatus includes: a fixed assembly, the fixed assembly including a base frame; a movable assembly, the movable assembly including a lens holder; a set of magnets surrounding the movable assembly; three sets of coils; and a spring system attached between the movable assembly and the fixed assembly and configured to support the movable assembly and form a suspension system to allow the movable assembly to move along a first, a second, and a third orthogonal axes. The lens holder is configured to hold a lens unit, the third axis is parallel to an optical axis of the lens unit, while the first and second axes are respectively perpendicular to the third axis.

20 Claims, 5 Drawing Sheets

(51) Int. Cl.
*H02K 41/035* (2006.01)
*G03B 3/10* (2006.01)
*G03B 5/02* (2006.01)

(52) U.S. Cl.
CPC . *H02K 41/0356* (2013.01); *G03B 2205/0015* (2013.01); *G03B 2205/0069* (2013.01)

(58) Field of Classification Search
CPC ............. H04N 5/2328; H04N 5/23287; H02K 41/0356
USPC ..... 359/554, 557, 814, 824–825; 310/12.16; 396/55, 133; 348/208.4–208.7, 208.11
See application file for complete search history.

(56) References Cited

FOREIGN PATENT DOCUMENTS

| | | |
|---|---|---|
| CN | 102236145 A | 11/2011 |
| CN | 102262279 A | 11/2011 |
| CN | 102445811 A | 5/2012 |
| CN | 103185942 A | 7/2013 |

\* cited by examiner

LENS DRIVING APPARATUS

CROSS-REFERENCE TO RELATED APPLICATIONS

This application claims the benefit of U.S. provisional patent application No. 61/883,275 filed on Sep. 27, 2013; the contents of which is hereby incorporated by reference.

FIELD OF THE PATENT APPLICATION

The present patent application generally relates to optical imaging technologies and more specifically to a lens driving apparatus with a three axes lens shifting mechanism for focusing an image and preventing a blurred image caused by unwanted shaking such as the shaking of a user's hand from being taken.

BACKGROUND

Portable imaging devices such as a mobile phone or a digital camera have been widely used today. Such devices have a camera with a lens structure to focus an image. In addition, such a device may be subject to some amount of unwanted shaking when being used to take a picture. An example of such shaking is the shaking of a user's hand. Therefore, it is desired to have a lens driving apparatus as well as a lens shifting mechanism that is capable of performing auto-focusing and anti-shaking functions, and achieving size reduction, cost reduction, fast response and stable actuation with a simple structure, and desired to have an image capturing apparatus equipped with such a lens shifting mechanism.

SUMMARY

The present patent application is directed to a lens driving apparatus. In one aspect, the lens driving apparatus includes: a fixed assembly, the fixed assembly including a base frame; a movable assembly, the movable assembly including a lens holder; a set of magnets surrounding the movable assembly; three sets of coils; and a spring system attached between the movable assembly and the fixed assembly and configured to support the movable assembly and form a suspension system to allow the movable assembly to move along a first, a second, and a third orthogonal axes. The lens holder is configured to hold a lens unit, the third axis is parallel to an optical axis of the lens unit, while the first and second axes are respectively perpendicular to the third axis.

The three sets of coils may be configured to interact with the magnets and drive the movable assembly to move along the three axes. The three sets of coils include a set of focusing coil and two sets of side coils. The focusing coil may be configured to drive the movable assembly to move along the third axis for focusing actions. The two sets of side coils may be configured to drive the movable assembly to move along the first and second axes for anti-shaking actions respectively. The focusing coil may be wound around a peripheral sidewall of the lens holder, the winding direction of the focusing coil may be parallel to the third axis, while the two sets of side coils may be attached on sidewalls of the lens holder and wound around the first axis and the second axis respectively. Polar surfaces of the magnets facing the coils and the movable assembly may be of the same magnetic polarity.

The spring system may include a top spring and a bottom spring. Each spring may include an outer portion, an inner portion and a spring arm. The inner portions of the top spring and the bottom spring may be attached at two ends of the lens holder, the outer portions of the top spring and the bottom spring may be attached to the fixed assembly, and the outer portions and the inner portions of springs may be connected by the spring arms respectively. For the top spring and the bottom spring, the ratio of the spring arm width to the spring thickness may be smaller than or equal to 1.1.

The spring constant of each spring may have a first component, a second component, and a third component along the first axis, the second axis, and the third axis respectively, while the ratio of the first component to the third component and the ratio of the second component to the third component may be both in the range of 1-8. The spring constant components for the top spring along the three axes may be approximately equal to the spring constant components for the bottom spring along the three axes respectively. The center of the spring system may be located at near a middle position between the top spring and the bottom spring.

The lens driving apparatus may further include a damping element. The damping element may be disposed between the moving assembly and a fixed part, and configured to absorb the unwanted vibration of one of the spring arms, the fixed part being the base frame or the magnets.

In another aspect, the lens driving apparatus includes: an outer casing; a fixed assembly, the fixed assembly including a base frame; a movable assembly, the movable assembly including a lens holder configured to hold a lens unit; a set of magnets surrounding the movable assembly, the set of magnets including four magnetic members; three sets of coils; and a spring system attached between the movable assembly and the fixed assembly and configured to support the movable assembly and form a suspension system to allow the movable assembly to move along a first, a second, and a third orthogonal axes. The third axis is parallel to an optical axis of the lens unit. The spring system includes a top spring and a bottom spring. Each spring includes an outer portion, an inner portion and a spring arm. The inner portions of the top spring and the bottom spring are attached at two ends of the lens holder, the outer portions of the top spring and the bottom spring are attached to the fixed assembly, and the outer portions and the inner portions of springs are connected by the spring arms respectively.

The spring constant of each spring may have a first component, a second component, and a third component along the first axis, the second axis, and the third axis respectively, while the ratio of the first component to the third component and the ratio of the second component to the third component may be both in the range of 1-8.

For the top spring and the bottom spring, the ratio of the spring arm width to the spring thickness may be smaller than or equal to 1.1. The spring constant components for the top spring along the three axes may be approximately equal to the spring constant components for the bottom spring along the three axes respectively. The four magnetic members may be attached to inside walls of the outer casing.

In yet another aspect, the lens driving apparatus includes: an outer casing; a fixed assembly, the fixed assembly including a base frame; a movable assembly, the movable assembly including a lens holder configured to hold a lens unit; a set of magnets surrounding the movable assembly, the set of magnets including four magnetic members; three sets of coils; and a spring system attached between the movable assembly and the fixed assembly and configured to support the movable assembly and form a suspension system to allow the movable assembly to move along a first, a second, and a third orthogonal axes. The third axis is parallel to an optical axis of the lens unit. The outer casing, the four magnetic members and the base frame form a central empty space configured for receiving the movable assembly. Among the four magnetic members, the first magnetic member is opposite to the third magnetic member, the second magnetic member is opposite to the fourth magnetic member, and the base frame is placed on an image sensor. The spring system includes a top spring and a bottom spring, each spring includes an outer portion, an inner portion and a spring arm, the inner portions of the top spring and the bottom spring are attached at two ends of the lens holder, the outer portions of the top spring and the bottom spring are attached to the fixed assembly, and the outer portions and the inner portions of springs are connected by the spring arms respectively. The four magnetic members are attached to inside walls of the outer casing.

The spring constant of each spring may have a first component, a second component, and a third component along the first axis, the second axis, and the third axis respectively, while the ratio of the first component to the third component and the ratio of the second component to the third component may be both in the range of 1-8.

For the top spring and the bottom spring, the ratio of the spring arm width to the spring thickness may be smaller than or equal to 1.1. The spring constant components for the top spring along the three axes may be approximately equal to the spring constant components for the bottom spring along the three axes respectively.

BRIEF DESCRIPTIONS OF THE DRAWINGS

DETAILED DESCRIPTION

Figure 1A:
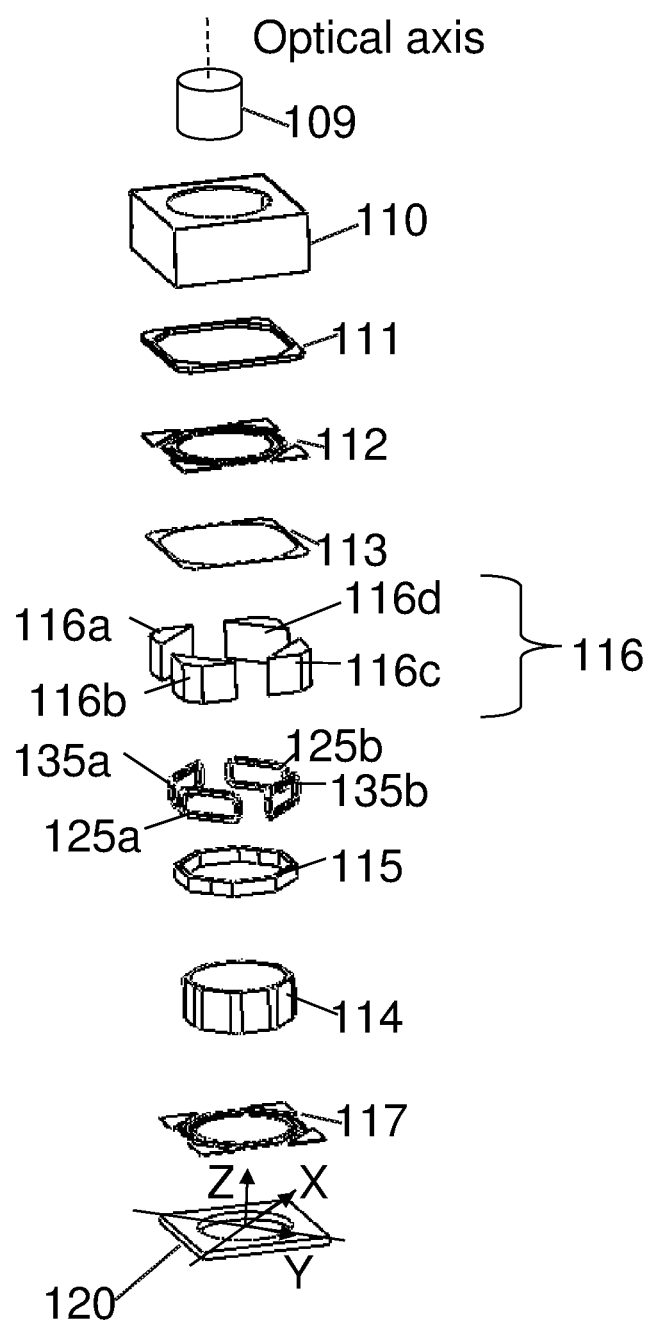
FIG. 1A is an exploded perspective view of a lens driving apparatus with a three axes lens shifting mechanism according to an embodiment of the present patent application.

Reference will now be made in detail to a preferred embodiment of the lens driving apparatus disclosed in the present patent application, examples of which are also provided in the following description. Exemplary embodiments of the lens driving apparatus disclosed in the present patent application are described in detail, although it will be apparent to those skilled in the relevant art that some features that are not particularly important to an understanding of the lens driving apparatus may not be shown for the sake of clarity.

Furthermore, it should be understood that the lens driving apparatus disclosed in the present patent application is not limited to the precise embodiments described below and that various changes and modifications thereof may be effected by one skilled in the art without departing from the spirit or scope of the protection. For example, elements and/or features of different illustrative embodiments may be combined with each other and/or substituted for each other within the scope of this disclosure.

An embodiment of the present patent application provides a lens driving apparatus that drives an image forming lens to move in order to perform optical functions. The lens driving apparatus can be applied to an imaging device that includes a light receiving surface. The imaging device is configured to convert optical image formed on the light receiving surface into an electric signal. The lens driving apparatus includes an imaging lens guiding an image of a subject to the light receiving surface, a movable assembly that includes an image forming lens and a lens holder, and a fixed part holding the imaging device and supporting the movable assembly to be movable translationally in three axes. The first axis is parallel to the direction of the optical axis (Z-axis) of the image forming lens. The second X and third Y axes are perpendicular to the optical axis of the image forming lens.

In this embodiment, the lens driving apparatus includes: a movable assembly that includes image forming lens and a lens holder, a fixed assembly, three sets of coils including one set of focusing coil and two sets of side coils, one set of magnets surrounding the movable assembly, a spring system attached between the movable assembly and fixed assembly and configured for supporting the movable assembly and forming a suspension system to allow the movable assembly to move along the three axes (Z, X and Y axes). Z-axis is parallel to the optical axis of the image forming lens. X-axis and Y-axis are two orthogonal axes perpendicular to the Z-axis. The spring system also provides a restoring force for the motion of the movable assembly. The three set of coils are configured to interact with the surrounding magnet set for driving the movable assembly to move along the three axes. The movable assembly is driven by the focusing coil to move along the optical axis (Z-axis) for focusing actions. Two set of side coils drive the movable assembly to move along the X-axis and Y-axis for anti-shaking actions. The focusing coil is wound around a peripheral sidewall of the lens holder and the winding direction of focusing coil is parallel to the optical axis (Z-axis). The two sets of side coils are attached on sidewalls of the lens holder and the two sets of side coils are wound around X and Y axis, respectively. The magnet set is configured to surround the movable part and face the two sets of side coils. The polar surface of magnet is facing the sidewall of lens holder and the side coil.

In this embodiment, the movable assembly is driven by the focusing coil along the Z-axis when the focusing coil is energized and interacted with the magnets. It is capable to perform the focusing action for image capturing device. Furthermore, the movable assembly is driven by two sets of side coils along X-axis and Y-axis, respectively, when the two sets of side coils are energized and interacting with the magnets. The movable assembly is capable of performing the anti-shaking actions for the image capturing device.

In this embodiment, the spring system includes at least one spring that forms a suspension system for holding the movable assembly. The spring system may include two leaf springs such as a top spring and a bottom spring. The inner portions of the top spring and the bottom spring are attached at the two ends of the lens holder. The outer portions of the top spring and the bottom spring are attached to a fixed part such as the base frame or an outer casing of lens driving apparatus. The outer portion and the inner portion of the spring are connected by a spring arm. To allow the movable assembly to move along X-axis and Y-axis, the spring is configured to have a special range of the spring arm to spring thickness ratio R (R=arm width/spring thickness), i.e. R<1.1. The spring with this special range of ratio R can provide the necessary condition to have a smaller spring constant component along X-axis and Y-axis while maintaining reasonable spring constant along the Z-axis (in-plane constant component), which may benefit the in-plane motion of the movably assembly, i.e. the anti-shaking motion. By using this spring system, the lens driving apparatus can achieve the three axes lens shifting mechanism to perform auto-focusing and anti-shaking functions.

Figure 1B:
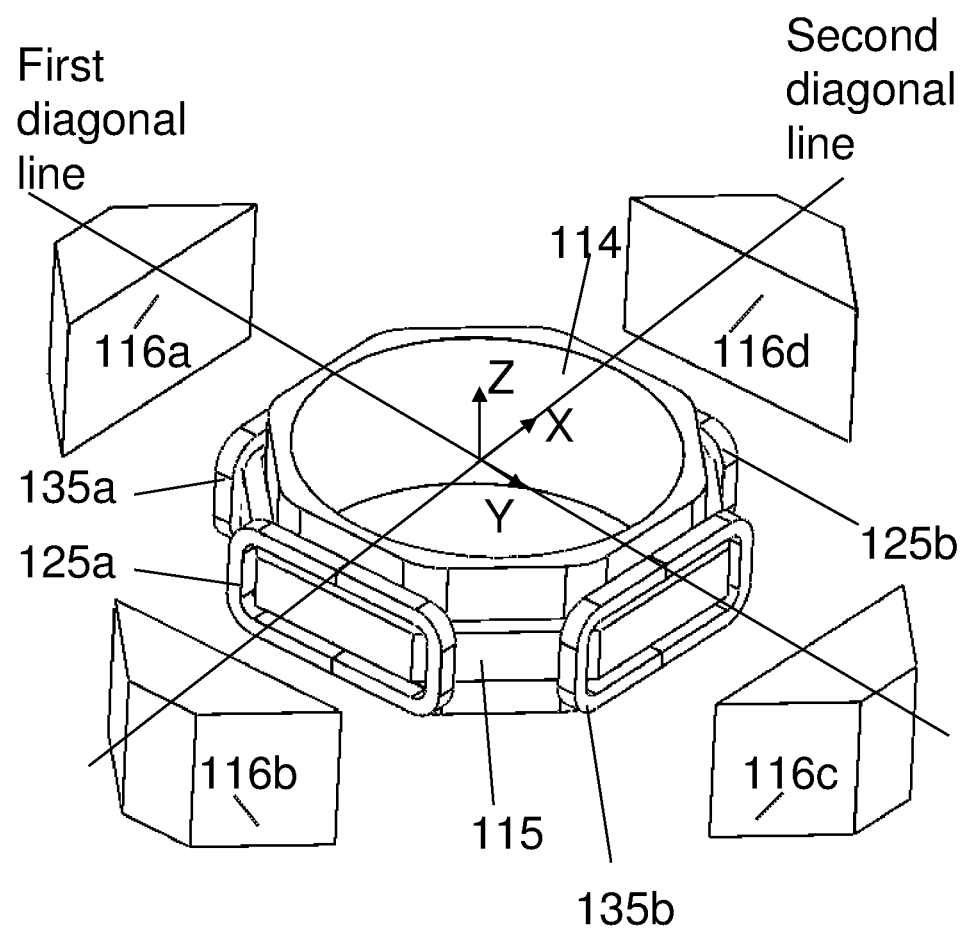
FIG. 1B is a perspective view of the lens driving apparatus depicted in FIG. 1A.

FIGS. 1A and 1B are exploded perspective view and perspective view, respectively, of a lens driving apparatus with a three axes lens shifting mechanism according to an embodiment of the present patent application. The lens driving apparatus can perform auto-focusing and anti-shaking functions mainly for installation on a portable device (not shown) to serve as an advanced image pickup module. The portable device may be, for example, a camera, a mobile phone, and etc.

Referring to FIGS. 1A and 1B, the lens driving apparatus includes a fixed assembly including a base frame 120; a movable assembly including a lens unit 109 and a lens holder 114; a top spring 112; a bottom spring 117; a set of magnets 116; three sets of coils; a spacer 111; and an outer casing 110. The top spring 112 and the bottom spring 117 connect the movable assembly and the fixed assembly. The set of magnets 116 include four magnetic members 116a, 116b, 116c and 116d. The three sets of coils include one focusing coil 115 and two sets of side coils 125a, b and 135a, b.

In this embodiment, the fixed assembly includes a base frame 120. The base frame has a rectangular configuration. The bottom spring 117 and the magnet set 116 are attached on top of the base frame 120. The four magnetic members 116a, 116b, 116c and 116d of the magnet set are attached to the inside walls of the outer casing 110. The outer casing 110 is placed on top of the base frame 120. The first magnetic member 116a is opposite to the third magnetic member 116c. The second magnetic member 116b is opposite to the fourth magnetic member 116d. The outer casing 110, four magnetic members and the base frame 120 forming a central empty space configured for receiving the movable assembly. The base frame 120 is placed on an image sensor (not shown in FIG. 1A or FIG. 1B) such as a CCD or a CMOS imaging sensor. A through hole defined in a central portion of the base frame 120 receives the light focused from the lens unit, while an image is focused by the lens unit and received by the image sensor.

The bottom spring 117 and the top spring 112 connect the fixed assembly and movable assembly and form a suspension system to hold and support the movable assembly to move along three axes. The first axis Z-axis is parallel to the optical axis of the lens unit. The second axis X-axis and the third axis Y-axis are perpendicular to the Z axis. For example, the second axis X-axis is the alignment line of the second magnetic member 116b and fourth magnetic member 116d. The third axis Y-axis is the alignment line of the first magnetic member 116a and the third magnetic member 116c. The three axes may be perpendicular to each other. The outer casing 110 is placed to enclose the magnet set 116 and the movable assembly. The outer case may be made of yoke material such as iron, which may act as a yoke to guide the magnetic field of the magnet set 116.

FIG. 1B shows a perspective view of the movably assembly, the coils and the magnets of the lens driving apparatus. The lens holder 114 may have a polygonal-tube shape. The focusing coil 115 is wound around the outer peripheral sidewall of the lens holder. The focusing coil 115 may have a polygonal-tube shape. The focusing coil 115 is wound around Z-axis and the plane of focusing coil 115 is perpendicular to Z-axis. The first set of side coils 135a and 135b are attached on the two opposite outer peripheral sidewalls of the lens holder. The first set of side coils 135a and 135b are wound around Y-axis and the plane of side coil 135a and 135b are perpendicular to Y-axis. The second set of side coils 125a and 125b are attached on another two outer peripheral sidewalls of the lens holder 114. The second set of side coils 125a and 125b are wound around X-axis and the planes of the side coils 125a and 125b are perpendicular to X-axis. The four peripheral sidewalls of the focusing coil 115 may be at the same plane with the four coil planes of four side coils, respectively.

Figure 1C:
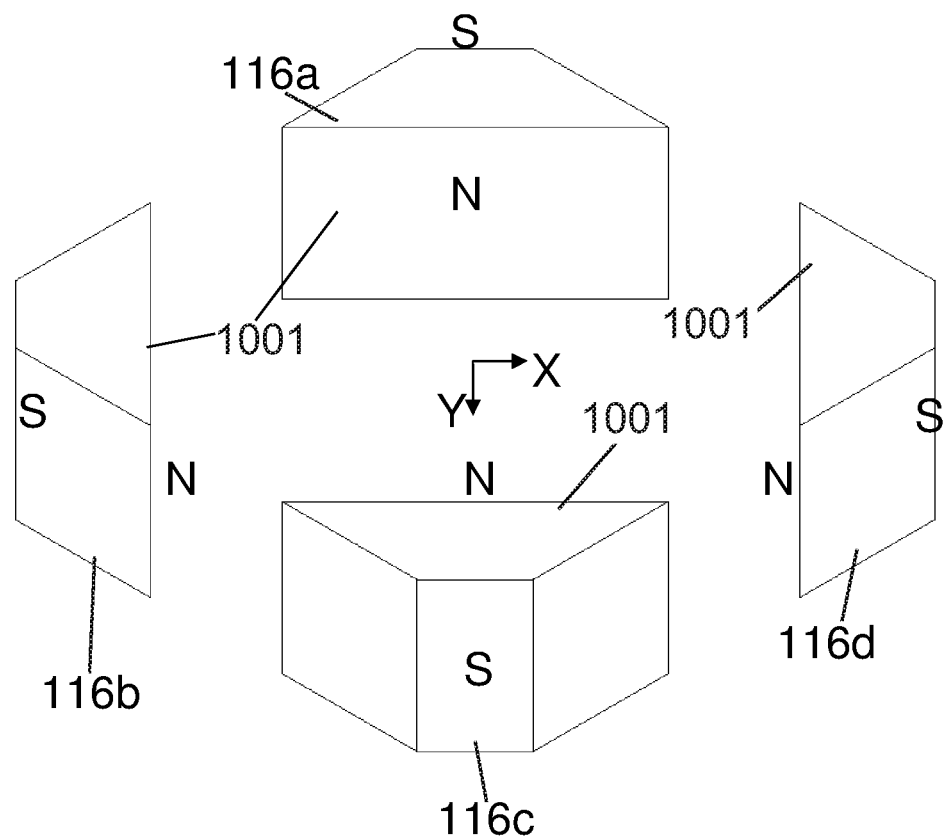
FIG. 1C shows the three sets of coils interacting with the magnet set surrounded by the coil sets produce a driving force to move the moving part along three orthogonal directions.

FIG. 1C shows the three sets of coils interacting with the magnet set surrounded by the coil sets produce a driving force to move the moving part along three orthogonal directions. The magnetic pole alignments of the magnetic members are perpendicular to Z-axis and parallel to X-axis or Y-axis. For example, the alignment of magnetic pole of magnets 116a and 116b is parallel to Y-axis and the alignment of magnetic pole of magnets 116b and 116d is parallel to X-axis, as shown in FIG. 1C. The polar surfaces of the magnetic members 116a, 116b, 116c, 116d facing the coils and the movable assembly are of the same magnetic polarity, for example, all the inner surfaces 1001 of the magnets 116a, 116b, 116c, 116d are north pole (shown in FIG. 1C).

In this embodiment, the movable assembly can be driven in a first direction along the optical axis (Z-axis) by controlling the direction of energizing. The focusing coil and a movable assembly can be driven in the second direction (Y-axis) or third direction (X-axis), which are orthogonal to the optical axis (Z-axis), by controlling the direction of energizing the first set of side coil and the second set of side coil, respectively. The movable assembly can be independently driven to move along Z-axis, Y-axis and X-axis by independently energizing the focusing coil 115, the first side coil set 135a and 135b, and the second side coil set 125a, 125b respectively.

Figure 2A:
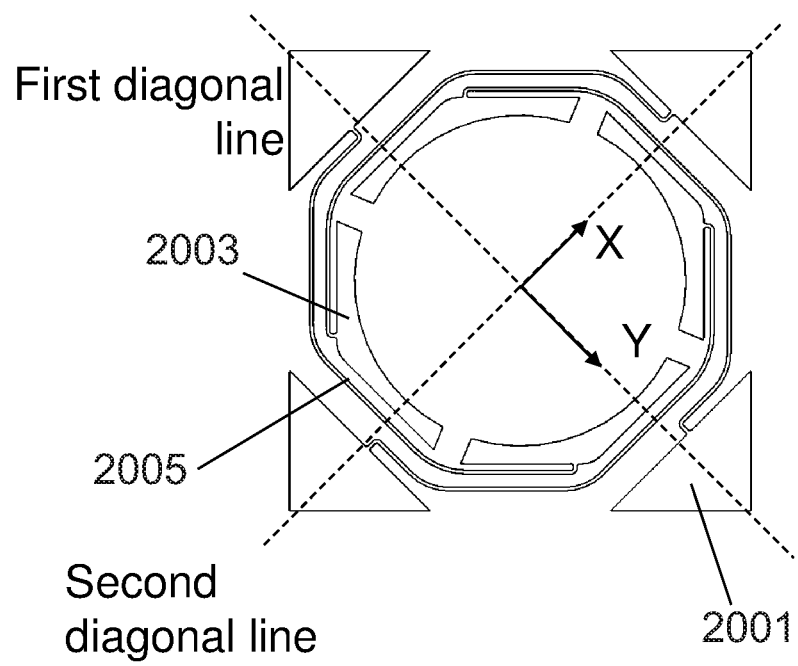
FIG. 2A shows a top view of the top spring of the lens driving apparatus depicted in FIG. 1A.
Figure 2B:
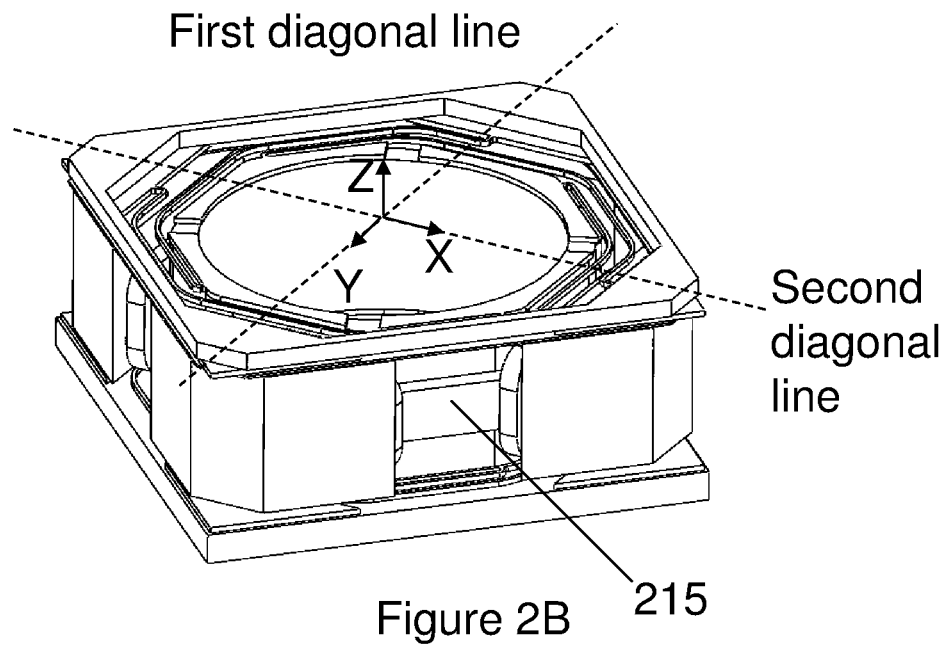
FIG. 2B shows a perspective view of the top spring of the lens driving apparatus depicted in FIG. 1A.

FIG. 2A shows a top view of the top spring of the lens driving apparatus. FIG. 2B shows a perspective view of the top spring of the lens driving apparatus. The top and bottom springs are leaf springs. Each of the spring includes an outer portion 2001, an inner portion 2003 and a spring arm 2005. The inner portion 2003 of the top spring is attached to a top position of the lens holder 114. The outer portion 2001 of the top spring is attached to a fixed part of the apparatus such as the outer casing 110. The inner portion of the bottom spring 117 is attached to a bottom position of the lens holder 114. The outer portion of the bottom spring 117 is attached to a fixed part of the apparatus such as the base frame. The outer portion 2001 and the inner portion 2003 of the spring are connected by the spring arm 2005. The springs may be made of metal sheet, for example, copper alloy. The focusing coil 215 and the two sets of side coils are placed in between the top spring and the bottom spring. In this embodiment, the focusing coil 215 is located at a middle position between the top spring and the bottom spring.

In this embodiment, the top spring and bottom spring form a suspension system or spring system for the lens driving apparatus. The suspension system can restrict the motion of the movable assembly and provide a restoring force to the movable assembly. The movable assembly can be driven along three axes Z-axis, X-axis and Y-axis by the focusing coil and the two sets of side coils. In order to allow the movable assembly to be driven along three axes Z-axis, X-axis and Y-axis by the focusing coil and the two sets of side coils, the spring constant of spring should be specially designed. The system spring constant K of the spring system depends on the spring material, the thickness of the spring, the width of the spring arm, and the spring arm pattern. The spring constant of each spring can be resolved into three spring constant components Kz, Kx and Ky along moving axes Z-axis, X-axis and Y-axis, respectively. Kz, Kx and Ky represent the spring system constant along the Z-axis, X-axis and Y-axis respectively. In this embodiment, since the movable assembly can perform focusing motion (motion along Z-axis) and anti-shaking motion (motions along X-axis and Y-axis), a special design of the spring constant ratio is required. For example, the ratio of Kx/Kz and Ky/Kz should be within the range 1 to 8, i.e. $1<=Kx/Kz<=8$, $1<=Ky/Kz<=8$. In this ratio range, the movable assembly is allowed to move along X-axis and Y-axis without suffering a large restoring force. With this spring constant ratio range, it ensures that the lens driving apparatus is capable to performing three axis lens shifting motion. The spring constant ratio Kx/Kz and Ky/Kz in this embodiment is smaller than that of a conventional auto-focusing (AF) lens driving apparatus. The conventional AF lens driving apparatus has a large spring constant ratio, for example Kx/Kz and Ky/Kz>10. Since the conventional AF lens driving apparatus can only do Z-axis motion, Kx and Ky should be significantly larger than Kz to restrict and limit the X-axis and Y-axis lens movement.

Figure 3:
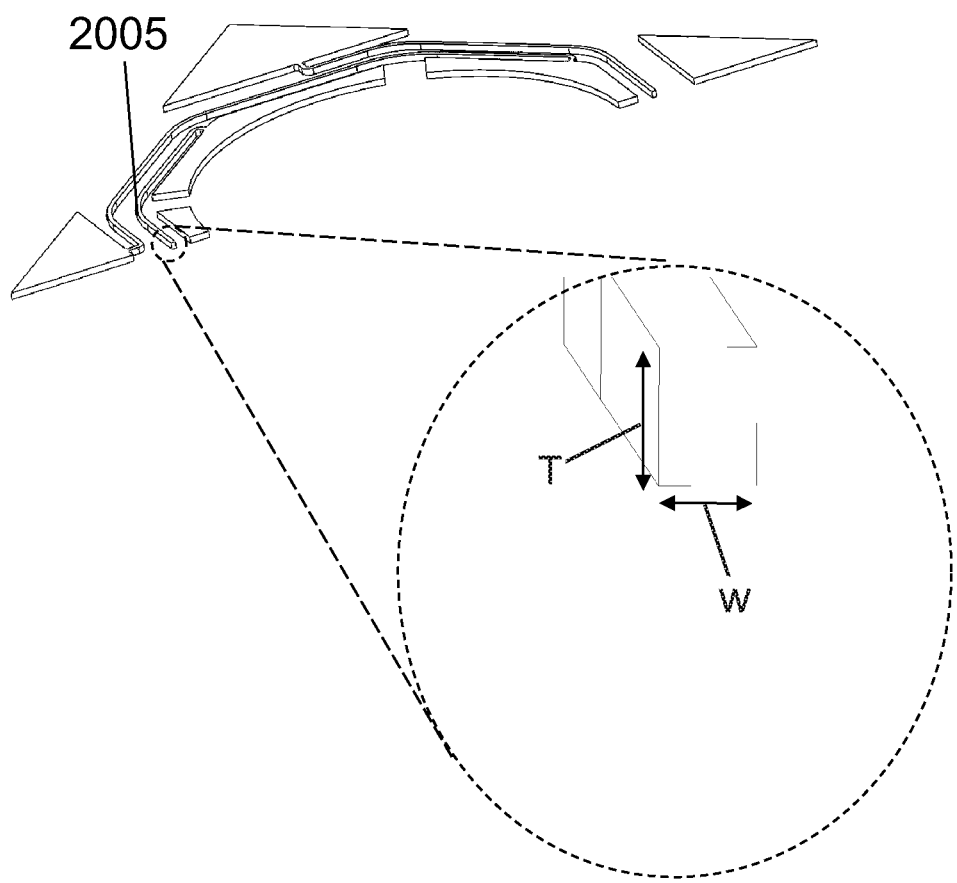
FIG. 3 is a cross-sectional view of a spring in the lens driving apparatus depicted in FIG. 1A.

FIG. 3 is a cross-sectional view of the spring. In this embodiment, the ratio of Kx/Kz and Ky/Kz of top spring and bottom springs should be within the range 1 to 8. In order to achieve this special spring constant range, the ratio of the spring arm width (W) of the spring to the thickness of spring should be smaller than or equal to 1.1, i.e. $W/T<=1.1$. When the spring arm width (i.e. the width of the spring arm 2005) is smaller than the thickness of spring, the ratio of Kx/Kz and Ky/Kz can be reduced.

In another embodiment, the top and bottom springs of the lens driving apparatus have similar spring constant components. The Kz, Kx and Ky of the top spring are approximately equal to the Kz, Kx and Ky of the bottom spring, respectively. When Kz, Kx and Ky of the top spring are approximately equal to Kz, Kx and Ky of the bottom spring, the rotation stiffness of the spring system can be maximized and the overall Ky/Kz and Kx/Kz of the spring system can be reduced. Furthermore, the center of the spring system is located at near the middle position between the top spring and the bottom spring.

In another embodiment, a damping element is placed at specific locations inside the lens driving apparatus. For an example, the damping element is placed surrounding the space of the outer portions of springs and the spring arms. When the movement of spring arm generating unwanted vibration, the damping element surrounding the spring arm is configured to absorb the unwanted vibration of the spring arm. In yet another embodiment, the damping element can be added between the moving assembly (i.e. lens holder) and a fixed part such as the outer casing, the base frame or the magnets. The method of making the spring may include etching or bending pre-formed wire stripes. The bended strips may be soldered with a pre-formed ring as the inner part of the spring structure.

While the present patent application has been shown and described with particular references to a number of embodiments thereof, it should be noted that various other changes or modifications may be made without departing from the scope of the present invention.

What is claimed is:

1. A lens driving apparatus comprising:
a fixed assembly, the fixed assembly comprising a base frame;
a movable assembly, the movable assembly comprising a lens holder;
a set of magnets surrounding the movable assembly;
three sets of coils; and
a spring system attached between the movable assembly and the fixed assembly and configured to support the movable assembly and form a suspension system to allow the movable assembly to move along a first, a second, and a third orthogonal axes; wherein:
the lens holder is configured to hold a lens unit, the third axis is parallel to an optical axis of the lens unit, while the first and second axes are respectively perpendicular to the third axis;
wherein the spring system comprises a top spring and a bottom spring, each spring comprises an outer portion, an inner portion and a spring arm, the inner portions of the top spring and the bottom spring are attached at two ends of the lens holder, the outer portions of the top spring and the bottom spring are attached to the fixed assembly, and the outer portions and the inner portions of springs are connected by the spring arms respectively;
wherein the spring constant of each spring has a first component, a second component, and a third component along the first axis, the second axis, and the third axis respectively, while the ratio of the first component to the third component and the ratio of the second component to the third component are $3<=Kx/Kz<=8$ and $3<=Ky/Kz<=8$, respectively, where Kx/Kz is the ratio of the first component to the third component, and Ky/Kz is the ratio of the second component to the third component.

2. The lens driving apparatus of claim 1, wherein the three sets of coils are configured to interact with the magnets and drive the movable assembly to move along the three axes.

3. The lens driving apparatus of claim 1, wherein the three sets of coils comprise a set of focusing coil and two sets of side coils, the focusing coil is configured to drive the movable assembly to move along the third axis for focusing actions, while the two sets of side coils are configured to drive the movable assembly to move along the first and second axes for anti-shaking actions respectively.

4. The lens driving apparatus of claim 3, wherein the focusing coil is wound around a peripheral sidewall of the lens holder with windings being stacked in a direction of the third axis, while the two sets of side coils are attached on sidewalls of the lens holder and wound around the first axis and the second axis respectively.

5. The lens driving apparatus of claim 1, wherein polar surfaces of the magnets facing the coils and the movable assembly are of the same magnetic polarity.

6. The lens driving apparatus of claim 1, wherein $4<=Kx/Kz<=8$ and $4<=Ky/Kz<=8$.

7. The lens driving apparatus of claim 1 further comprising a damping element, wherein the damping element is disposed between the moving assembly and a fixed part, and configured to absorb the unwanted vibration of one of the spring arms, the fixed part being the base frame or the magnets.

8. The lens driving apparatus of claim 1, wherein the center of the spring system is located at near a middle position between the top spring and the bottom spring.

9. A lens driving apparatus comprising:
an outer casing;
a fixed assembly, the fixed assembly comprising a base frame;
a movable assembly, the movable assembly comprising a lens holder configured to hold a lens unit;
a set of magnets surrounding the movable assembly, the set of magnets comprising four magnetic members;
three sets of coils; and
a spring system attached between the movable assembly and the fixed assembly and configured to support the movable assembly and form a suspension system to allow the movable assembly to move along a first, a second, and a third orthogonal axes; wherein:
the third axis is parallel to an optical axis of the lens unit; and
the spring system comprises a top spring and a bottom spring, each spring comprises an outer portion, an inner portion and a spring arm, the inner portions of the top spring and the bottom spring are attached at two ends of the lens holder, the outer portions of the top spring and the bottom spring are attached to the fixed assembly, and the outer portions and the inner portions of springs are connected by the spring arms respectively;
wherein the spring constant of each spring has a first component, a second component, and a third component along the first axis, the second axis, and the third axis respectively, while the ratio of the first component to the third component and the ratio of the second component to the third component are $3<=Kx/Kz<=8$ and $3<=Ky/Kz<=8$, respectively, where $Kx/Kz$ is the ratio of the first component to the third component, and $Ky/Kz$ is the ratio of the second component to the third component; and
wherein the spring constant components for the top spring along the three axes are approximately equal to the spring constant components for the bottom spring along the three axes respectively.

10. The lens driving apparatus of claim 9, wherein for the top spring and the bottom spring, the ratio of the spring arm width to the spring thickness is smaller than or equal to 1.1.

11. The lens driving apparatus of claim 9, wherein the four magnetic members are attached to inside walls of the outer casing.

12. A lens driving apparatus comprising:
an outer casing;
a fixed assembly, the fixed assembly comprising a base frame;
a movable assembly, the movable assembly comprising a lens holder configured to hold a lens unit;
a set of magnets surrounding the movable assembly, the set of magnets comprising four magnetic members;
three sets of coils; and
a spring system attached between the movable assembly and the fixed assembly and configured to support the movable assembly and form a suspension system to allow the movable assembly to move along a first, a second, and a third orthogonal axes; wherein:
the third axis is parallel to an optical axis of the lens unit;
the outer casing, the four magnetic members and the base frame form a central empty space configured for receiving the movable assembly;
among the four magnetic members, the first magnetic member is opposite to the third magnetic member, the second magnetic member is opposite to the fourth magnetic member, and the base frame is placed on an image sensor;
the spring system comprises a top spring and a bottom spring, each spring comprises an outer portion, an inner portion and a spring arm, the inner portions of the top spring and the bottom spring are attached at two ends of the lens holder, the outer portions of the top spring and the bottom spring are attached to the fixed assembly, and the outer portions and the inner portions of springs are connected by the spring arms respectively; and
the four magnetic members are attached to inside walls of the outer casing;
wherein the spring constant of each spring has a first component, a second component, and a third component along the first axis, the second axis, and the third axis respectively, while the ratio of the first component to the third component and the ratio of the second component to the third component are $3<=Kx/Kz<=8$ and $3<=Ky/Kz<=8$, respectively, where $Kx/Kz$ is the ratio of the first component to the third component, and $Ky/Kz$ is the ratio of the second component to the third component; and
wherein the spring constant components for the top spring along the three axes are approximately equal to the spring constant components for the bottom spring along the three axes respectively.

13. The lens driving apparatus of claim 12, wherein for the top spring and the bottom spring, the ratio of the spring arm width to the spring thickness is smaller than or equal to 1.1.

14. A lens driving apparatus comprising:
a fixed assembly, the fixed assembly comprising a base frame;
a movable assembly, the movable assembly comprising a lens holder;
a set of magnets surrounding the movable assembly;
three sets of coils;
a damping element; and
a spring system attached between the movable assembly and the fixed assembly and configured to support the movable assembly and form a suspension system to allow the movable assembly to move along a first, a second, and a third orthogonal axes;
wherein the lens holder is configured to hold a lens unit, the third axis is parallel to an optical axis of the lens unit, while the first and second axes are respectively perpendicular to the third axis;
wherein the spring system comprises a top spring and a bottom spring, each spring comprises an outer portion, an inner portion and a spring arm, the inner portions of the top spring and the bottom spring are attached at two ends of the lens holder, the outer portions of the top spring and the bottom spring are attached to the fixed assembly, and the outer portions and the inner portions of springs are connected by the spring arms respectively;
wherein the spring constant of each spring has a first component, a second component, and a third component along the first axis, the second axis, and the third axis respectively, while the ratio of the first component to the third component and the ratio of the second component to the third component are $3<=Kx/Kz<=8$ and $3<=Ky/Kz<=8$, respectively, where $Kx/Kz$ is the ratio of the first component to the third component, and $Ky/Kz$ is the ratio of the second component to the third component; and
wherein the damping element is disposed between the moving assembly and a fixed part, and configured to absorb unwanted vibration of one of the spring arms, the fixed part being the base frame or the magnets.

15. The lens driving apparatus of claim 14, wherein the three sets of coils are configured to interact with the magnets and drive the movable assembly to move along the three axes.

16. The lens driving apparatus of claim 14, wherein the three sets of coils comprise a set of focusing coil and two sets of side coils, the focusing coil is configured to drive the movable assembly to move along the third axis for focusing actions, while the two sets of side coils are configured to drive the movable assembly to move along the first and second axes for anti-shaking actions respectively.

17. The lens driving apparatus of claim 16, wherein the focusing coil is wound around a peripheral sidewall of the lens holder with windings being stacked in a direction of the third axis, while the two sets of side coils are attached on sidewalls of the lens holder and wound around the first axis and the second axis respectively.

18. The lens driving apparatus of claim 14, wherein polar surfaces of the magnets facing the coils and the movable assembly are of the same magnetic polarity.

19. The lens driving apparatus of claim 14, wherein for the top spring and the bottom spring, the ratio of the spring arm width to the spring thickness is smaller than or equal to 1.1.

20. The lens driving apparatus of claim 14, wherein the center of the spring system is located at near a middle position between the top spring and the bottom spring.

* * * * *